March 8, 1927.
C. C. BURMEISTER
STAGGING HOOK
Filed Aug. 25, 1925
1,620,436
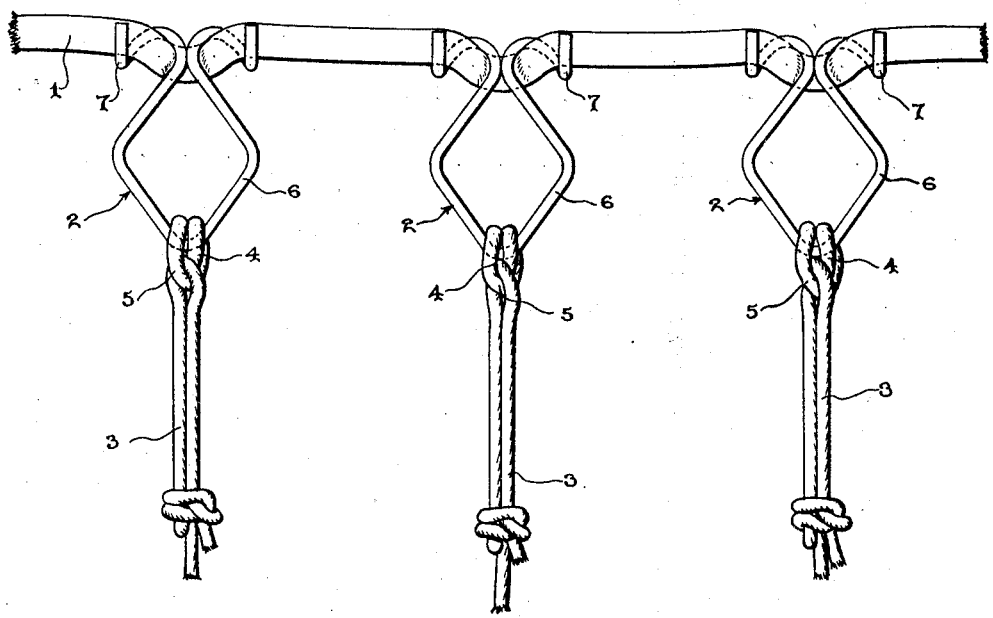
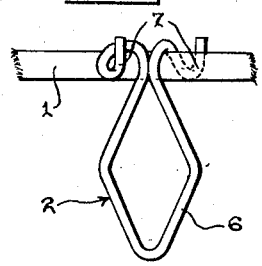
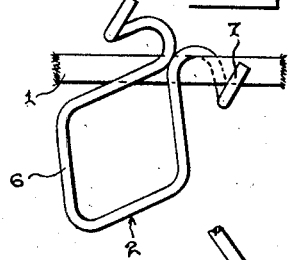
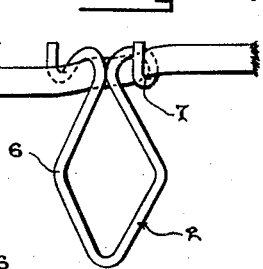
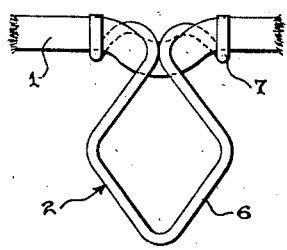
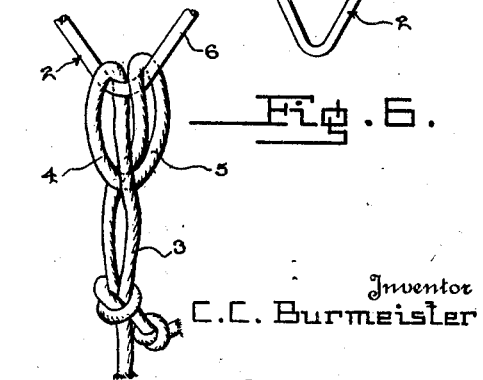
Inventor
C.C. Burmeister
By
Attorney Patented Mar. 8, 1927.

1,620,436

UNITED STATES PATENT OFFICE.

CHARLES C. BURMEISTER, OF DAVENPORT, IOWA.

STAGGING HOOK.

Application filed August 25, 1925. Serial No. 52,341.

The present invention has for its purpose to provide, in connection with a set line for fishing, a stagging hook carried by a fishing line and including means for permitting the hook to be easily and very quickly attached and detached to the set line.

In connection with this character of fishing, a set line is fixed across stream and drawn relatively tight, not too much as would cause the line to tighten as the result of dampness and eventually break but tight enough to support a plurality of fishing lines mid-stream, the stagging hooks being carried by the various fishing lines which are attached to the set line by the fisherman going across the stream in a boat and applying and removing the several lines.

Another purpose is to provide a stagging hook constructed from a single length of line bent to form a loop for attachment of the fishing line, with the ends of the arms of the loop bent to form ram's horns which extend from each other as shown, so that by looping one horn over the set line and imparting a partial twist thereto, one horn may be attached, and then by imparting a similar twist to the hook, the other horn may be attached, holding the hook secure and against detachment. The attachment of the hook to the set line is such as to prevent slipping to any marked degree.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view of a set line which is supposed to extend transversely of a stream, showing a plurality of stagging hooks connected thereto with the fishing lines applied.

Figure 2 is an enlarged detail view showing the position of the stagging hook in the act of performing its first step in connecting one of the horns to the set line.

Figure 3 is a view showing one horn attached.

Figure 4 is a view showing the other horn partially attached.

Figure 5 is a view showing the second horn completely attached.

Figure 6 is an enlarged detail view of a loop on the end of a fishing line, showing it connected to the loop of the stagging hook by means of a slip knot, the knot being relatively loose in order to show its construction.

Referring to the drawings, 1 designates a set line and 2 the stagging hook and 3 a fishing line of which there may be a plurality enabling several fishing lines to be arranged on the set line for fishing mid-stream. The fisherman crosses the steam in a boat with the several fishing lines and their attaching stagging hooks, and by imparting several slight twists to the hook, it may be connected to the set line, as shown in the several steps disclosed in the drawings. The fishing lines may be disconnected by a similar process.

Each fishing line is connected to the stagging hook 2 through the medium of a loop 4 formed in the fishing line, which loop is arranged to provide a slip knot 5 for connection to the stagging hook. Each stagging hook 2 is constructed from a single length of wire of any suitable metal, preferably of a character such as will not corrode. The single piece of wire is bent to form a loop 6 of any suitable contour, preferably diamond-shaped, and the terminals of the arms of the loop merge toward each other and terminate in ram's horns 7.

These horns 7 are of spiral construction extending away from each other, the spirals being similar so that by disposing one horn, as in Figure 2, and imparting a twist to the hook, as in Figure 3, one horn may be attached to the set line, and then by imparting an additional twist to the hook, as in Figure 4, the second horn may be attached to the hook, as in Figure 5. Obviously, a fisherman may easily and quickly attach and detach the hooks, when setting the fishing lines, without a great amount of inconvenience.

The invention having been set forth, what is claimed is:

The combination with a set line to extend across stream, of a fishing line having an attached stagging hook, said hook consisting of a loop with its arms provided with ram's horns extending spirally in directions away from each other, whereby upon imparting several twists to the hook, first one and then the other of the ram's horns may be connected to the set line.

In testimony whereof he affixes his signature.

CHARLES C. BURMEISTER.